United States Patent
Yablokov et al.

(10) Patent No.: US 12,481,759 B2
(45) Date of Patent: Nov. 25, 2025

(54) SYSTEM AND METHOD OF ANTI-VIRUS SCANNING OF OBJECTS ON A MOBILE DEVICE

(71) Applicant: AO Kaspersky Lab, Moscow (RU)

(72) Inventors: Victor V. Yablokov, Moscow (RU); Konstantin M. Filatov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 63 days.

(21) Appl. No.: 18/617,763

(22) Filed: Mar. 27, 2024

(65) Prior Publication Data

US 2024/0419799 A1    Dec. 19, 2024

(30) Foreign Application Priority Data

Jun. 13, 2023   (RU) ............................ RU2023115437

(51) Int. Cl.
*G06F 21/56* (2013.01)
*G06F 8/61* (2018.01)
*G06F 8/65* (2018.01)

(52) U.S. Cl.
CPC ............. *G06F 21/568* (2013.01); *G06F 8/61* (2013.01); *G06F 8/65* (2013.01); *G06F 21/564* (2013.01); *G06F 21/566* (2013.01)

(58) Field of Classification Search
CPC . G06F 21/568; G06F 8/61; G06F 8/65; G06F 21/564; G06F 21/566; G06F 21/56
See application file for complete search history.

(56) References Cited

U.S. PATENT DOCUMENTS

| | | | |
|---|---|---|---|
| 8,387,141 B1 | 2/2013 | Zhukov et al. | |
| 8,566,932 B1 | 10/2013 | Hotta et al. | |
| 9,479,357 B1 | 10/2016 | Fu et al. | |
| 9,705,919 B1* | 7/2017 | Jacobsen | H04L 63/102 |
| 9,894,099 B1* | 2/2018 | Jacobsen | H04L 67/34 |
| 11,106,476 B2 | 8/2021 | Hesener et al. | |
| 11,134,104 B2* | 9/2021 | Qureshi | H04L 63/0471 |
| 2012/0151585 A1 | 6/2012 | Lamastra et al. | |
| 2019/0122191 A1* | 4/2019 | Filipiak | G06Q 20/3223 |
| 2022/0382862 A1* | 12/2022 | Kivva | G06F 21/564 |
| 2024/0388598 A1* | 11/2024 | Cartan | H04L 63/1433 |

* cited by examiner

*Primary Examiner* — El Hadji M Sall
(74) *Attorney, Agent, or Firm* — ArentFox Schiff LLP; Michael Fainberg

(57) ABSTRACT

Disclosed herein are systems and methods for anti-virus scanning of objects on a mobile device. In one aspect, an exemplary method comprises: receiving, by a security module, a command from a protection module of a third-party application to perform an anti-virus scan, when a mobile security application is installed or pre-installed, when the mobile security application is not activated, activating the mobile security application, when the mobile security application is not installed or pre-installed on the mobile device, installing and activating the mobile security application, transmitting the object to the mobile security application, performing an anti-virus scan of the object to determine whether the object is malicious, transmitting results of the anti-virus scan to a protection module of a third-party application, selecting at least one response measure based on the result of the anti-virus scan, and applying at least one selected response measure.

20 Claims, 4 Drawing Sheets

SYSTEM AND METHOD OF ANTI-VIRUS SCANNING OF OBJECTS ON A MOBILE DEVICE

CROSS-REFERENCE TO RELATED APPLICATIONS

The present application claims priority to Russian Patent Application No. RU2023115437, filed on 13 Jun. 2023, the entire content of which is incorporated herein by reference.

FIELD OF TECHNOLOGY

The present disclosure relates to the field of information security, and more specifically to systems and methods for ensuring the security applications on mobile devices by anti-virus scanning of objects on the mobile devices.

BACKGROUND

Today, a mobile computing device (hereinafter referred to as a mobile device) has become an integral part of a person's (user's) life. Generally, most mobile devices contain various user data that is necessary for a person's daily life. Such data may be personal data, such as last name, first name, patronymic, year of birth, phone numbers, photos and videos, and/or confidential data, such as login and password to a personal account on a bank's website, or credit card number.

One of the most popular mobile platforms used on mobile devices is the Google Android operating system (hereinafter referred to as the Android OS). First of all, the Android OS has gained popularity as a result of it being open-source and free of charge, leading to its distribution across various hardware platforms and the creation of a large number of different applications for the operating system. To date, several million applications have already been created for the Android OS, which have been installed on more than two billion mobile devices around the world. At the same time, malware for mobile devices using Android have also become increasingly active. Malware for mobile devices means any software (hereinafter referred to as the Software) containing malicious code and/or designed to gain unauthorized access to the computing resources of mobile devices or to information stored on them, with the aim of utilizing resources without permission or causing harm to owners of mobile devices by copying, distorting, deleting or substituting information. In particular, information refers to the personal and confidential data of the owner of the mobile device. Examples of unauthorized use of mobile device resources include actions aimed at making unauthorized payments, sending messages containing spam, and calling premium numbers. Because installed applications on mobile devices may have access to sensitive user data in one way or another, it has become important to protect mobile devices and their apps from malware.

One of the solutions to ensure security on a mobile device is to use a special app, namely a mobile security app. A mobile security application is an application designed to detect malware and, depending on implementation, has different approaches for anti-virus scanning of objects on a mobile device. Mobile security applications tend to have an impact of a high load on resources of the mobile device, thereby affecting the mobile device during the fulfillment of its purposes. In particular, there is a need to use a large amount of permanent memory for the installation of the app itself and local databases, as well as RAM during operation. As a result, operating other apps on the mobile device and the mobile device itself as a whole becomes difficult.

Another disadvantage of mobile security apps is the limitations associated with the OS architecture for mobile devices—Android and iOS. In these operating systems, each application runs within an isolated environment, with access only to its own virtual storage.

An analysis of state of the art allows us to conclude that the use of current technologies is not sufficiently effective in ensuring the security of mobile applications, in particular, in the implementation of anti-virus scanning of objects on a mobile device with acceptable levels of resource consumption of the mobile device.

Therefore, there is a need for a method and a system that allow one to both ensure the security of mobile applications and to reduce the load on the resources of the mobile device.

SUMMARY

Aspects of the disclosure relate to systems and methods for enabling the security of applications on mobile devices while reducing the load on the resources of the mobile device. The security of mobile device applications is carried out by conducting an anti-virus scan of objects on the mobile device.

In one exemplary aspect, a method for anti-virus scanning of objects on a mobile device is disclosed, the method comprising: receiving, by a security module, a command from a protection module of a third-party application, to perform an anti-virus scan of an object using the security module; checking, by the security module, whether a mobile security application is installed or pre-installed on the mobile device; when the mobile security application is installed or pre-installed, determining whether the mobile security application is activated, and when the mobile security application is not activated, activating the mobile security application; when the mobile security application is not installed or pre-installed on the mobile device, installing and activating the mobile security application; transmitting, by the security module, the object to the mobile security application for performing an anti-virus scan of the object; performing an anti-virus scan of the object to determine whether the object is malicious; transmitting, by the security module, results of the anti-virus scan to a protection module of a third-party application; selecting, by the protection module, at least one response measure based on the result of the anti-virus scan; and applying, by the security module, at least one selected response measure.

In one aspect, the command to perform an anti-virus scan of the object is obtained after detecting suspicious activity and wherein the suspicious activity is associated with at least one object.

In one aspect, the suspicious activity is detected using a protection module using behavioral blockers or patterns of dangerous application behavior.

In one aspect, the command for performing the anti-virus scan of the object comprises at least the following information: a location of the object and a name of the object.

In one aspect, the object for performing the anti-virus scan comprises at least one of: a file; a link; a message text; a spam email; and a network package.

In one aspect, the activation and installation of the mobile security application is performed in one of the following ways: by providing a request to a user of the mobile device; in accordance with a group policy of the mobile device; and in automatic mode when installing the third-party application.

In one aspect, the anti-virus scan of the object is performed using at least one of the following: an interaction with a cloud security service; and a database located in the mobile security application.

In one aspect, the at least one response measure is aimed at securing the third-party application of the mobile device and include at least one of the following: removal of a malicious object; changing of access rights to the malicious object; placing the malicious object in a spam category; warning a user about a presence of the malicious object on the mobile device; quarantining of the malicious object; blocking incoming traffic by IP address; disconnecting the mobile device from the Internet; information support for the user of the mobile device when the malicious object is detected; changing settings of the mobile security application on the mobile device; blocking a click on a phishing link; updating an operating system or rolling back an operating system of the mobile device to factory settings; and updating the third-party application to a latest version.

According to one aspect of the disclosure, a system is provided for anti-virus scanning of objects on a mobile device, the system comprising at least one memory; and at least one hardware processor coupled with the at least one memory and configured, individually or in combination, to: receive, by a security module, a command from a protection module of a third-party application, to perform an anti-virus scan of an object using the security module; check, by the security module, whether a mobile security application is installed or pre-installed on the mobile device; when the mobile security application is installed or pre-installed, determine whether the mobile security application is activated, and when the mobile security application is not activated, activate the mobile security application; when the mobile security application is not installed or pre-installed on the mobile device, install and activate the mobile security application; transmit, by the security module, the object to the mobile security application for performing an anti-virus scan of the object; perform an anti-virus scan of the object to determine whether the object is malicious; transmit, by the security module, results of the anti-virus scan to a protection module of a third-party application; select, by the protection module, at least one response measure based on the result of the anti-virus scan; and apply, by the security module, at least one selected response measure.

In one exemplary aspect, a non-transitory computer-readable medium is provided storing a set of instructions thereon for anti-virus scanning of objects on a mobile device, wherein the set of instructions comprises instructions for: receiving, by a security module, a command from a protection module of a third-party application, to perform an anti-virus scan of an object using the security module; checking, by the security module, whether a mobile security application is installed or pre-installed on the mobile device; when the mobile security application is installed or pre-installed, determining whether the mobile security application is activated, and when the mobile security application is not activated, activating the mobile security application; when the mobile security application is not installed or pre-installed on the mobile device, installing and activating the mobile security application; transmitting, by the security module, the object to the mobile security application for performing an anti-virus scan of the object; performing an anti-virus scan of the object to determine whether the object is malicious; transmitting, by the security module, results of the anti-virus scan to a protection module of a third-party application; selecting, by the protection module, at least one response measure based on the result of the anti-virus scan; and applying, by the security module, at least one selected response measure.

The technical result of the present method is to increase the security of information from third-party applications on a mobile device. This technical result is achieved through the system of the present disclosure, which is designed to ensure the security of an application on a mobile device.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for anti-virus scanning of objects on a mobile device in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 4:
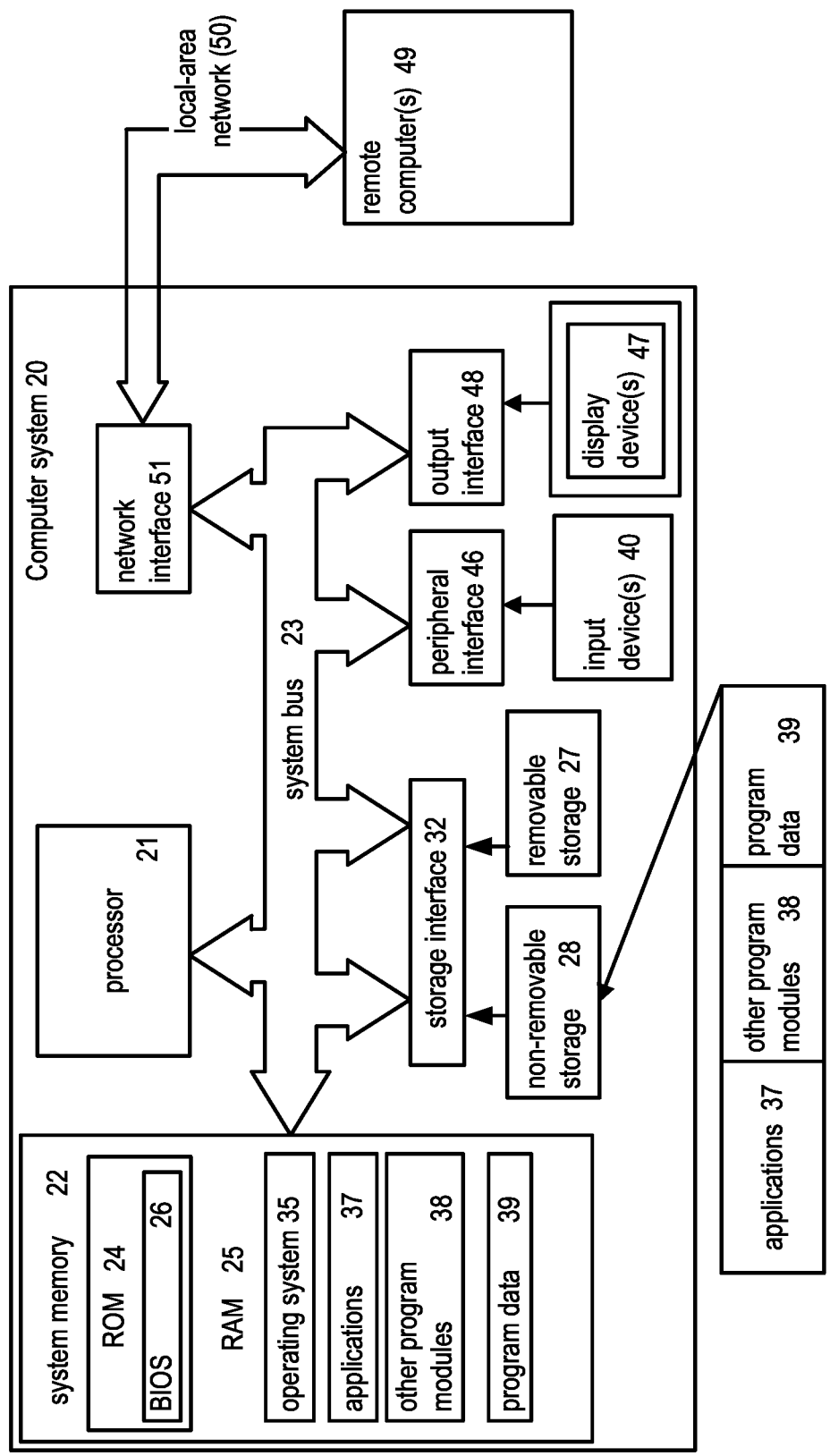
FIG. 4 presents an example of a general-purpose computer system on which aspects of the present disclosure for anti-virus scanning of objects on a mobile device can be implemented.

In some aspects of the present disclosure, some or all of the system for classifying objects to prevent the spread of malicious activity may be implemented on the processor of a general-purpose computer (which, for example, is depicted in FIG. 4). In this case, the components of the system may be realized within a single computing device, or distributed amongst several interconnected computing devices. The present disclosure describes a technical solution for anti-virus scanning of objects on a mobile device.

The method of the present disclosure provides a technical solution for ensuring the security of mobile applications and the mobile device as a whole by using a security module in a third-party application. At the same time, the method of the present disclosure allows to reduce the load on the resources of the mobile device while implementing the security of the mobile device.

Figure 1:
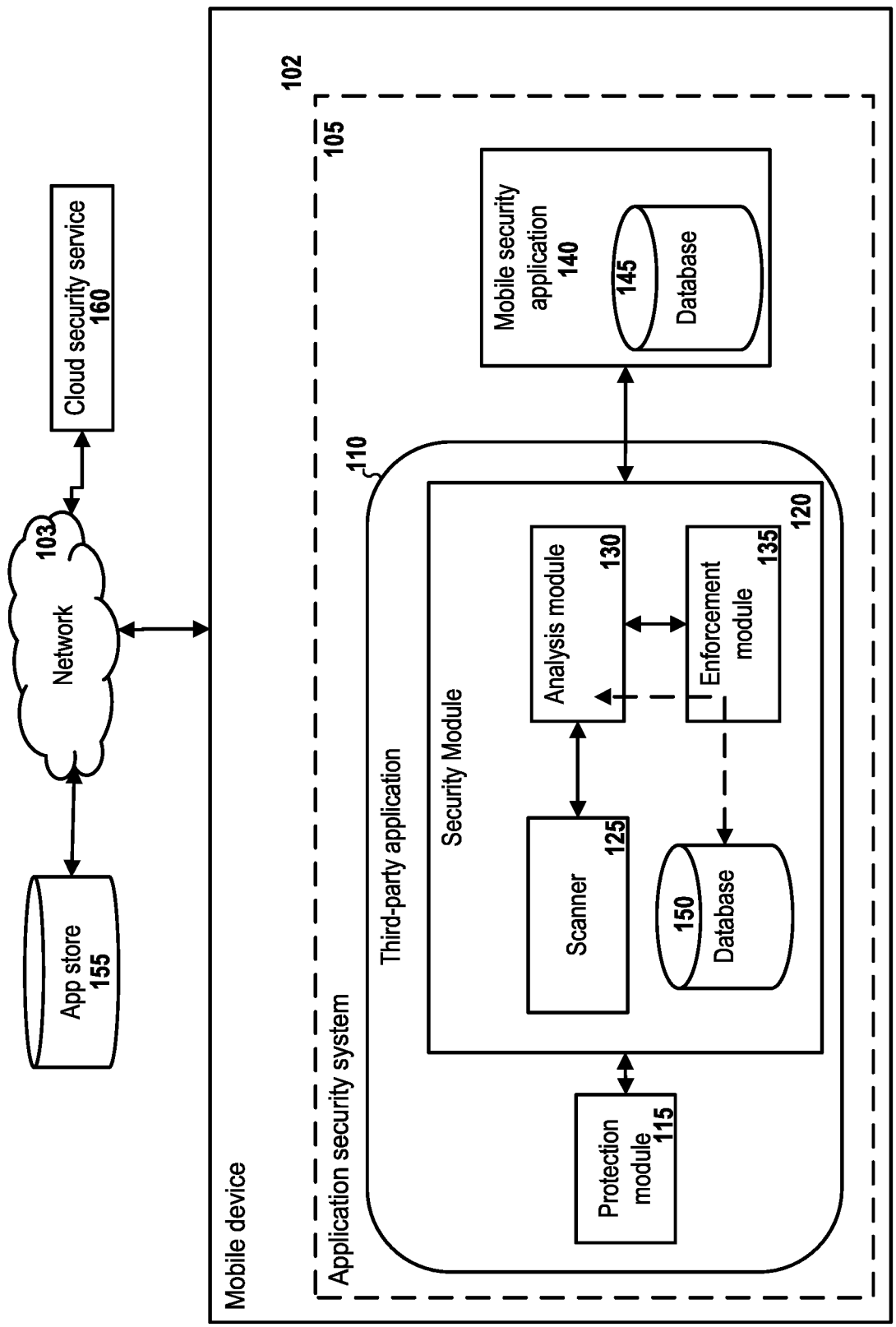
FIG. 1 illustrates a block diagram of an exemplary application security system for anti-virus scanning of objects on a mobile device, in accordance with aspects of the present disclosure.

FIG. 1 illustrates a block diagram of an exemplary application security system for anti-virus scanning of objects on a mobile device, in accordance with aspects of the present disclosure.

In a preferred aspect, the application security system 105 is implemented on the mobile device 102 and includes at least one third-party application 110 and a mobile security application 140 comprising a database 145. In turn, the third-party application 110 includes a protection module 115 and a security module 120, wherein the security module 120 consists of a scanner 125, an analysis module 130, an enforcement module 135, and a database 150. It is worth noting that the security module.

The 120 is an embedded component within the third-party application 110 and is designed to provide protection against malicious activity by the third-party application 110. Depending on the implementation, the security module 120 may be either an integral part of the third-party application 110 or an independent module embedded in the third-party application 110.

The mobile device 102 comprises at least a computing device, such as a smartphone, tablet, smartwatch, handheld game console, personal navigation device, and data receiving terminal. Another example of a computing device is the computer system shown in FIG. 4.

The third-party application 110 comprises third-party software designed to work on smartphones, tablets and other mobile devices, developed for a specific platform (Android, Windows Phone, iOS, etc.), but not intended for anti-virus scanning of objects.

The protection module 115 located in the third-party application 110 is designed to monitor the activity of the third-party application 110 in order to detect suspicious activity, and objects related to the detected suspicious activity.

The object, in particular, comprises objects such as:
files;
references;
message texts;
spam emails; or
network packages.

Examples of activity are activities such as: downloading a file, opening a file, or clicking on a link.

In one aspect, the protection module 115 monitors the activity of the third-party application 110, using behavioral blockers or patterns of dangerous application behavior. For example, if the activity of the third-party application 110 matches one of the patterns of dangerous behavior or if a suspicious activity is detected, the protection module 115 detects such activity as suspicious, detects at least one object associated with the specified activity, and prohibits further actions with the detected object by applying a block. It is worth noting that when implementing a third-party application 110, the protection module 115 may use other approaches known in the art to control the activity of the third-party application 110. Next, the protection module 115 transmits a command to perform an anti-virus scan of the detected object associated with suspicious activity to the security module 120. The command to perform an object scan contains at least the following information: the location of the object (for example, the path to the file) and the name of the object.

The following are examples of protection modules 115 when implemented in various third-party applications 110.

In one aspect, in a third-party application 110, e.g., a banking application provided by financial institutions for remote interaction, the protection module 115 is responsible for monitoring transactions for unauthorized access to customer data, e.g., credit card data on the mobile device 102 by identifying the program that initiates the execution of transactions, the URL of the transaction acceptance, and applying filters (e.g., validator filters, stop list filters, authorization limit filters). For example, unauthorized access to the credit card data may occur as a result of the Trojan-Banker.AndroidOS.Faketoken. This Trojan displays fake forms for collecting the credit card data on top of the banking (third-party) application 110, thereby stealing the credit card data (i.e. card number, PIN code, CVV). Among other things, Trojan-Banker.AndroidOS.Faketoken intercepts all incoming SMS passwords on the mobile device 102 and transmits them to the attackers' servers. If the Trojan is suspected of intercepting data, the protection module 115 on the mobile device 102 intercepts the suspicious activity and sends at least one command to perform an anti-virus scan of the object determined as "the application file whose window is currently active" associated with the suspicious activity to the security module 120. The security module 120 requests permission from the third-party application 110 to perform its functionality in the third-party application 110.

In another aspect, in a third-party application 110, such as an instant messenger, the protection module 115 is responsible for monitoring incoming messages for spam and the attached links for phishing, and analyzing downloaded files for maliciousness. In the event that spam, phishing, or a malicious object (file) is detected, the protection module 115 intercepts suspicious activity and transmits at least one command to perform an anti-virus scan of the spam email, the phishing link, or the file object associated with the suspicious activity to the security module 120. The security module 120 requests permissions from the third-party application 110 to perform its functionality in the third-party application 110. Before the security module 120 performs an anti-virus scan of the object, the protection module 115 may remove all personal data from the message, such as mentioning of names, e-mail addresses, and other personal data.

The security module 120, which is a component of the third-party application 110, is designed to perform an anti-virus scan of an object corresponding to the command received from the protection module 115 in order to identify a malicious object. The security module 120 has limited functionality and capabilities for anti-virus scanning of objects compared to the mobile security application 140. For example, the security module 120 may have only one of the following types of scanning, and each type of scan may have a limited implementation: a scanning wherein there is no ability to emulate files or run in a restricted environment (sandbox); a scanning in which the size of databases for checking a hash sum or a digital signature of a file is limited,; and, a scanning in which the functionality of the security module 120 is limited only to working with executable files assembled without the use of programs, such as executable packers. An executable packer refers to a program for reducing the size of executable files. When packers are used, a compressed copy of the original file and a program for decompression are written to the packaged file. As a result of the limited functionality and capabilities, the security module 120 requires less CPU and RAM resources than the mobile security app 140. In yet another aspect, the security module 120 has only the ability to search for and/or install on the mobile device 102 of an application designed to perform an anti-virus security scan, such as the mobile security application 140.

Upon receipt of an object associated with suspicious activity, in order to perform an antivirus scan, the security module 120 uses the scanner 125 to scan for the presence of a mobile security application 140. The scanner 125 verifies that the mobile security application 140 is installed or pre-installed on the mobile device 102 by calling the Application Programming Interface (API) set of functions, and by:

when the mobile security application 140 is pre-installed or installed on the mobile device 102, checking whether the mobile security application 140 is activated, and when the pre-installed or installed application is not activated, activating the pre-installed or installed mobile security application 140; and when the mobile security application 140 is not installed or pre-installed from the mobile device 102, the mobile security application 140 is installed and activated.

The scanner 125, upon detecting the installed or pre-installed but not activated mobile security application 140, informs the security module 120 that the detected mobile security application 140 should be activated. The security module 120 activates the mobile security application 140 by interacting with a user of the mobile device 102, or automatically if the security module 120 has the appropriate permissions on the mobile device 102. For example, the security module 120 may send a request to the user, wherein the request contains information about the presence of the mobile security application 140 installed on the mobile device 102 and whether it needs to be activated and waits for an activation response. The request is sent to the user using data input/output interfaces. Once the mobile security application 140 is activated, the security module 120 communicates with the activated mobile security application 140. In another aspect, the security module 120 initiates the activation process of the security application 140 by making a security application window 140 active so that the user can perform all the necessary actions for activation (e.g., entering of the activation code, read the license agreement, and the like).

In the absence of the mobile security application 140, the scanner 125 informs the security module 120 to install and activate the mobile security application 140. In one aspect of the invention, installation of the mobile security application 140 is accomplished by prompting the user of the mobile device 102. The scanner 125 over the network 103 detects an available app store 155 and sends a request to install the mobile security application 140 to the user of the mobile device 102. The particular app store 155 depends on the OS type of the mobile device 102, for Android-Google Play, RuStore, Samsung Galaxy Store, Xiaomi Mi GetApps, etc., for iOS-App Store, etc. In one aspect, the request to install the mobile security application 140 may be implemented using a mailbox and SMS messages on the mobile device 102. For example, the security module 120 may send an email or SMS message containing a link to the app storefront of the mobile security application 140 or may send the mobile security application 140 as an attachment. In the event that there is no security mobile app 140 in the app store 155, or no app store 155 is available for the mobile device 102, the request may contain a permission to install the mobile security application 140 from the Internet (e.g., for Android, this will be a link to the APK file). Once the mobile security app 140 is installed, activation is performed in one of the previously listed ways.

In one aspect, the installation and activation of the mobile security application 140 is performed in accordance with the Group Policy of the mobile device 102. Mobile device Group Policy should be understood as a single set of settings for managing mobile devices that are part of an administration group, as well as mobile applications installed on devices. For example, in a corporate or local network a list of mobile applications is installed and activated on a mobile device 102 according to the Group Policy. This installation and activation occurs after the mobile device is turned on, rebooted, or updated.

In another aspect, the installation and activation of the mobile security application 140 may be performed automatically. For example, when a third-party application 110 is installed, the mobile security application 140 is additionally installed by default on the mobile device 102.

In the event that the mobile security application 140 is not installed on the mobile device 102 or is installed but not activated, and there is no option for activation, the security module 120 performs an inspection of the object itself using the analysis module 130.

In this way, the security module 120 transmits an object to perform the check:

to the mobile security application 140 in the event that the mobile security application 140 is installed and activated on the mobile device 102; and to the analysis module 130 in the event that the mobile security application 140 is not installed or is installed but not activated, and there is no activation option on the mobile device 102.

In a preferred aspect, the security module 120 passes the scan object to the mobile security application 140. The mobile security application 140 performs an anti-virus scan of an object for compliance with a malicious object. A malicious object comprises an object created with the help of malicious code designed to gain unauthorized access to information or resources of a device of the user, in particular, the mobile device 102. An example of a mobile security application 140 is Kaspersky Lab's Kaspersky Total Security product, specifically for mobile devices.

The mobile security application 140, as compared to the security module 120, has no limitations in its functionality for anti-virus scanning of objects, and also has access to the cloud security service 160. Depending on the implementation options, the inspection of the object is performed either by the mobile security application 140 itself or by the cloud security service 160, and may include signature-based or heuristic scanning of information about object code fragments, the use of behavioral analyzers, as well as the use of online services that analyze suspicious files, and sandboxes. In a preferred aspect, the mobile security application 140 performs an anti-virus scan of an object using a cloud security service 160 (e.g., Kaspersky Security Network) over the network 103.

In another aspect, the mobile security application 140 performs an inspection of an object using a database 145. In one aspect, database 145 stores at least signatures, heuristics, and file hashes. Inspection of the object by the mobile security application 140 using the database 145 includes signature and heuristic scanning (analysis) of the object's code, the use of behavioral analyzers. The results of the scanning of the object are transmitted by the mobile security application 140 to the protection module 115 using the security module 120.

As previously stated, in the event that the mobile security application 140 is not installed or is installed but not activated on the mobile device 102, the security module 120 performs an inspection of the object using the analysis module 130 and the database 150. The analysis module 130 performs an inspection of the object using signatures from the database 150. The results of the object inspection are transmitted by the analysis module 130 to the protection module 115.

In a particular aspect of the present disclosure, the security module 120 further checks for permissions in the third-party application 110 to perform self-inspection of the object. For example, the security module 120 may be embedded in a third-party "mobile game" application 110 and may not have sufficient permissions. For example, the security module 120 may not have permissions to access components such as: speaker, contacts, calendar, device location, messages on the device, Wi-Fi connection data. Therefore, the inspection of the third-party application object 110 by the analysis module 130 in the security module 120 may be incomplete or impossible due to insufficient permissions. In another example, the security module 120 may be located in a third-party application 110, with system level preferences. Thus, on the mobile device 102, the security module 120 may have sufficient number of permissions, as the system app has unrestricted access to the entire mobile device. The analysis module 130 independently inspects the object of the third-party application 110. The results of the object inspection are transmitted by the analysis module 130 to the protection module 115.

Based on the test results obtained from the security module 120, the protection module 115 selects response measures, if necessary. A list of exemplary measures is given below.

The response measures to secure the third-party application 110 of the mobile device 102 selected by the protection module 115 include at least one of the following:
- removing of a malicious object;
- changing of access rights to a malicious object;
- placing a malicious object in the spam category;
- warning the user about the presence of a malicious object on the mobile device 102;
- quarantining of a malicious object;
- blocking incoming traffic by IP address;
- disconnecting the mobile device 102 from the Internet;
- providing information support for the user of the mobile device 102 when a malicious object is detected;
- changing the settings of the mobile security app on the mobile device 102;
- blocking the click on a phishing link;
- updating the operating system or rolling back mobile device 102 to factory settings; and
- updating the third-party application 110 to the latest version.

The protection module 115 transmits a command to the security module 120 to execute one or more of the selected response measures. The security module 120, using the enforcement module 135, executes the response measures selected by the protection module 115. For example, the results of the scanning may reveal a malicious object—a phishing link in an SMS message; then, the protection module 115 may select the following responses: alerting the user of the mobile device 102 to the presence of the phishing link, and blocking the click on the phishing link.

In one aspect, based on the results of the inspection of the results of the analysis module 130, the enforcement module 135 may immediately apply the response measures.

Table-1 provides examples of response measures stored in the database 150 that are used when an anti-virus scan identifies a relevant malicious object.

TABLE 1

| Malicious Objects | Response |
| --- | --- |
| File | Deleting a file; changing access rights to a file; quarantining a file. |

TABLE 1-continued

| Malicious Objects | Response |
| --- | --- |
| Reference | Removal of the link; warning the user of the mobile device 102 about the presence of a phishing link; informing the user about the prohibition of clicking on the link or marking the sender of the link as an "untrusted user"; blocking the click on a phishing link. |
| Text | Placing text in the spam category. |
| Network Package | Blocking incoming traffic by IP address; blocking network packets using firewall rules. |

Figure 2:
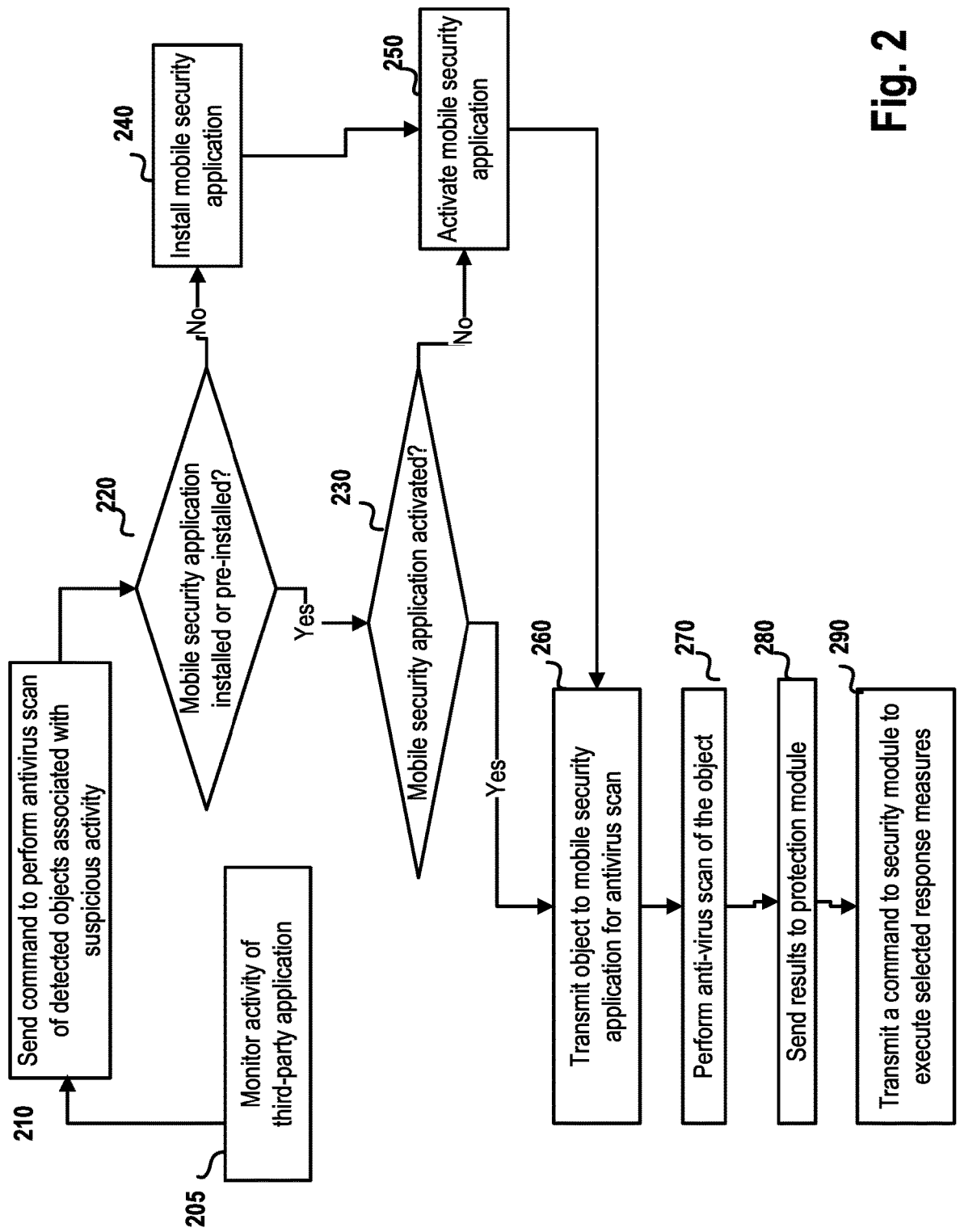
FIG. 2 illustrates an example of a method for anti-virus scanning of objects on a mobile device in accordance with aspects of the present disclosure.

FIG. 2 illustrates an example of a method 200 for anti-virus scanning of objects on a mobile device in accordance with aspects of the present disclosure. In one aspect, method 200 is implemented using the security system of application 105 provided in conjunction with the description of FIG. 1.

In step 205, by the protection module 115, method 200 monitors the activity of the third-party application 110 in order to detect a suspicious activity and one or more objects associated with the detected suspicious activity. Examples of the suspicious activity are downloading a file from an unknown IP address, receiving a message from an unknown sender, and so on.

In step 210, by the protection module 115, method 200 sends a command to the security module 120 to perform an anti-virus scan of the detected object associated with the suspicious activity. In one aspect, the command to perform an anti-virus scan of an object contains at least the following information: a location of the object (for example, the path to the file) and a name of the object.

In step 220, after the security module 120 is instructed to perform an anti-virus scan of the identified object associated with suspicious activity, by the scanner 125, method 200 performs a scan of the object for a presence of a mobile security application 140. The scanner 125 verifies that the mobile security application 140 is installed or pre-installed on a mobile device by calling the necessary API functions. If the scanner 125 detects that the mobile security application 140 is installed or pre-installed, method 200 proceeds to step 230. In the event that the mobile security application 140 is not present on the mobile device 102, then method 200 proceeds to step 240.

In step 230, the scanner 125 verifies whether the installed or preinstalled mobile security application 140 is activated. If the mobile security application 140 is not activated, then method 200 proceeds to step 250. In the event that the mobile security application 140 is activated, then method 200 proceeds to the step 260.

In step 240, the scanner 125 informs the security module 120 to install the mobile security application 140. In one aspect, the installation of the mobile security application 140 is accomplished by providing a request to the user of the mobile device 102. Using the scanner 125 over the network 103, method 200 locates an available app store 155 and sends a request for the installation of the mobile security application 140 to the user of the mobile device 102. The request to install the mobile security application 140 is sent using the mailbox and SMS messages on the mobile device 102. With the help of the security module 120, method 200 sends a letter to the mailbox or an SMS message containing a link to the showcase of the mobile security application 140 or an attached file of the mobile security application 140. In the absence of a mobile security application 140 in the app store 155, or in the absence of an app store 155 on mobile device 102, the request comprises a request to authorize an installation of the mobile security application 140 from the Internet (e.g., for Android, this will be a link to the APK file).

In step 250, by the security module 120, method 200 activates the mobile security application 140 by interacting with the user of the mobile device 102 or automatically, if the security module 120 has the appropriate permissions on the mobile device 102. For example, a request may be sent to the user using the security module 120, wherein the request contains information about the presence of the installed mobile security application 140 on the mobile device 102 and whether it needs to be activated and waits for an activation response. In another aspect, the security module 120 initiates the activation process of the security application 140 by making the security application window 140 active so that the user can perform all necessary actions for activation.

In one aspect, the installation and activation of the mobile security application 140 is performed in accordance with the Group Policy of the mobile device 102. For example, in a corporate or local area network, a list of mobile applications is installed and activated on mobile device 102 according to Group Policy.

In another aspect, the installation and activation of the mobile security application 140 is performed automatically. For example, when a third-party application 110 is installed, the mobile security application 140 is additionally installed on the default mobile device 102.

In step 260, by the security module 120, method 200 transmits the object to the mobile security application 140 to perform an antivirus scan. Using the mobile security application 140, method 200 performs an anti-virus scan of the object for compliance with the malicious object. A malicious object should be understood as an object created with the help of malicious code aimed at obtaining unauthorized access to information or resources of the user's device, in particular the mobile device 102.

In step 270, an anti-virus scan of the object is performed using the mobile security application 140. In a preferred aspect, the scanning is performed by interacting with a cloud security service 160 (e.g., Kaspersky Security Network) over the network 103. In one aspect, the scanning of an object using a cloud security service 160 includes signature-based and heuristic scanning of information about object code fragments, the use of behavioral analyzers, as well as the use of online services that analyze suspicious files, and sandboxes.

In another aspect, the mobile security application 140 uses the database 145 to perform an object inspection. Verification of the object by the mobile security application 140 using the database 145 includes, in particular, signature and heuristic scanning of information about fragments of the object's code, the use of behavioral analyzers.

In step 280, by the mobile security application 140, method 200 transmits the test results to the protection module 115 via the security module 120. With the help of the protection module 115, based on the results of the anti-virus scan from the security module 120, the response measures are selected, if necessary.

In step 290, by the protection module 115, method 200 transmits a command to the security module 120 to execute the selected response measures. The security module 120, using the enforcement module 135, executes the response measures selected by the protection module 115. In the special case of implementation of method 200, the response measures are immediately applied based on the results of the scanning.

Figure 3:
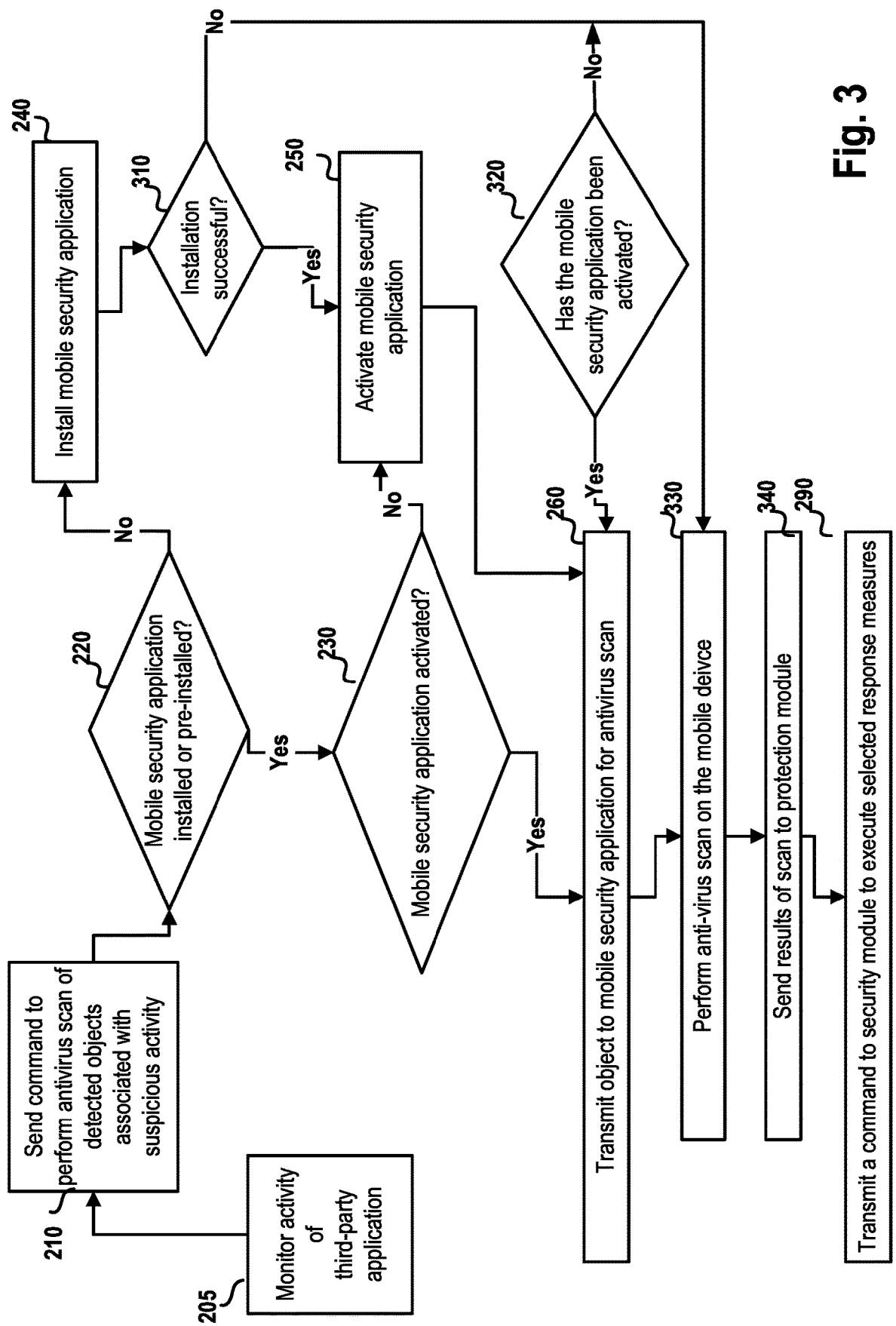
FIG. 3 illustrates an example implementation of a method for anti-virus scanning of objects on a mobile device in accordance with aspects of the present disclosure.

FIG. 3 illustrates an example implementation of a method 300 for anti-virus scanning of objects on a mobile device in accordance with aspects of the present disclosure.

In one aspect, method 300 is implemented using the security features of application security system 105, as described in FIG. 1, and method 300 complements the method 200 presented in conjunction with the description of FIG. 2. Thus, the steps 205, 210, 220, 230, 240, 250, 260 and 290 shown in FIG. 3. are the same steps shown in FIG. 2.

In step 310, by the scanner 125, method 300 verifies that the mobile security application is installed in step 240. If the mobile security application 140 is installed, then method 300 proceeds to step 320. In the event that the mobile security application 140 is not installed on the mobile device 102, then method 300 proceeds to step 330.

In step 320, by the scanner 125, method 300 verifies that the mobile security application 140 has been activated in step 250. In the event that the mobile security application 140 is not activated, then, method 300 proceeds to step 330. In the event that the mobile security application 140 is activated, method 300 proceeds to step 260.

In step 330, if the mobile security application 140 is not installed or is installed but not activated, and there is no option for activation method 300, by the analysis module 130, performs an antivirus scan on the mobile device 102 using signatures from the database 150. In the event that the mobile security application 140 is successfully activated, see the description of step 270 in FIG. 2.

In step 340, by the component that performed antivirus scan in step 330 (i.e. the mobile security application 140 or the analysis module 130), method 300 transmits the results of the scan to the protection module 115 via the security module 120. With the help of the protection module 115, based on the results of the anti-virus scan from the security module 120, the response measures are selected, if necessary.

FIG. 4 is a block diagram illustrating a computer system 20 on which aspects of systems and methods for anti-virus scanning of objects on a mobile device may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for anti-virus scanning of objects on a mobile device, the method comprising:
  receiving, by a security module, a command from a protection module of a third-party application, to perform an anti-virus scan of an object using the security module;
  checking, by the security module, whether a mobile security application is installed or pre-installed on the mobile device;
  when the mobile security application is installed or pre-installed, determining whether the mobile security application is activated, and when the mobile security application is not activated, activating the mobile security application;
  when the mobile security application is not installed or pre-installed on the mobile device, installing and activating the mobile security application;
  transmitting, by the security module, the object to the mobile security application for performing an anti-virus scan of the object;
  performing an anti-virus scan of the object to determine whether the object is malicious;
  transmitting, by the security module, results of the anti-virus scan to a protection module of a third-party application;
  selecting, by the protection module, at least one response measure based on the result of the anti-virus scan; and
  applying, by the security module, at least one selected response measures.

2. The method of claim 1, wherein the command to perform an anti-virus scan of the object is obtained after detecting suspicious activity and wherein the suspicious activity is associated with at least one object.

3. The method of claim 2, wherein the suspicious activity is detected using a protection module using behavioral blockers or patterns of dangerous application behavior.

4. The method of claim 1, wherein the command for performing the anti-virus scan of the object comprises at least the following information: a location of the object and a name of the object.

5. The method of claim 1, wherein the object for performing the anti-virus scan comprises at least one of:
  a file;
  a link;
  a message text;
  a spam email; and
  a network package.

6. The method of claim 1, wherein the activation and installation of the mobile security application is performed in one of the following ways:
  by providing a request to a user of the mobile device;
  in accordance with a group policy of the mobile device; and
  in automatic mode when installing the third-party application.

7. The method of claim 1, wherein the anti-virus scan of the object is performed using at least one of the following:
  an interaction with a cloud security service; and
  a database located in the mobile security application.

8. The method of claim 1, wherein the at least one response measure is aimed at securing the third-party application of the mobile device and include at least one of the following:
  removal of a malicious object;
  changing of access rights to the malicious object;
  placing the malicious object in a spam category;
  warning a user about a presence of the malicious object on the mobile device;
  quarantining of the malicious object;
  blocking incoming traffic by IP address;
  disconnecting the mobile device from the Internet;
  information support for the user of the mobile device when the malicious object is detected;
  changing settings of the mobile security application on the mobile device;
  blocking a click on a phishing link;
  updating an operating system or rolling back an operating system of the mobile device to factory settings; and
  updating the third-party application to a latest version.

9. A system for anti-virus scanning of objects on a mobile device, comprising:
  at least one memory; and
  at least one hardware processor coupled with the at least one memory and configured, individually or in combination, to:
    receive, by a security module, a command from a protection module of a third-party application, to perform an anti-virus scan of an object using the security module;
    check, by the security module, whether a mobile security application is installed or pre-installed on the mobile device;

when the mobile security application is installed or pre-installed, determine whether the mobile security application is activated, and when the mobile security application is not activated, activate the mobile security application;

when the mobile security application is not installed or pre-installed on the mobile device, install and activate the mobile security application;

transmit, by the security module, the object to the mobile security application for performing an anti-virus scan of the object;

perform an anti-virus scan of the object to determine whether the object is malicious;

transmit, by the security module, results of the anti-virus scan to a protection module of a third-party application;

select, by the protection module, at least one response measure based on the result of the anti-virus scan; and apply, by the security module, at least one selected response measures.

10. The system of claim 9, wherein the command to perform an anti-virus scan of the object is obtained after detecting suspicious activity and wherein the suspicious activity is associated with at least one object.

11. The system of claim 10, wherein the suspicious activity is detected using a protection module using behavioral blockers or patterns of dangerous application behavior.

12. The system of claim 9, wherein the command for performing the anti-virus scan of the object comprises at least the following information: a location of the object and a name of the object.

13. The system of claim 9, wherein the object for performing the anti-virus scan comprises at least one of:
   a file;
   a link;
   a message text;
   a spam email; and
   a network package.

14. The system of claim 9, wherein the activation and installation of the mobile security application is performed in one of the following ways:
   by providing a request to a user of the mobile device;
   in accordance with a group policy of the mobile device; and
   in automatic mode when installing the third-party application.

15. The system of claim 9, wherein the anti-virus scan of the object is performed using at least one of the following:
   an interaction with a cloud security service; and
   a database located in the mobile security application.

16. The system of claim 9, wherein the at least one response measure is aimed at securing the third-party application of the mobile device and include at least one of the following:
   removal of a malicious object;
   changing of access rights to the malicious object;
   placing the malicious object in a spam category;
   warning a user about a presence of the malicious object on the mobile device;
   quarantining of the malicious object;
   blocking incoming traffic by IP address;
   disconnecting the mobile device from the Internet;
   information support for the user of the mobile device when the malicious object is detected;
   changing settings of the mobile security application on the mobile device;
   blocking a click on a phishing link;
   updating an operating system or rolling back an operating system of the mobile device to factory settings; and
   updating the third-party application to a latest version.

17. A non-transitory computer readable medium storing thereon computer executable instructions for anti-virus scanning of objects on a mobile device, including instructions for:
   receiving, by a security module, a command from a protection module of a third-party application, to perform an anti-virus scan of an object using the security module;
   checking, by the security module, whether a mobile security application is installed or pre-installed on the mobile device;
   when the mobile security application is installed or pre-installed, determining whether the mobile security application is activated, and when the mobile security application is not activated, activating the mobile security application;
   when the mobile security application is not installed or pre-installed on the mobile device, installing and activating the mobile security application;
   transmitting, by the security module, the object to the mobile security application for performing an anti-virus scan of the object;
   performing an anti-virus scan of the object to determine whether the object is malicious;
   transmitting, by the security module, results of the anti-virus scan to a protection module of a third-party application;
   selecting, by the protection module, at least one response measure based on the result of the anti-virus scan; and
   applying, by the security module, at least one selected response measures.

18. The non-transitory computer readable medium of claim 17, wherein the command to perform an anti-virus scan of the object is obtained after detecting suspicious activity and wherein the suspicious activity is associated with at least one object.

19. The non-transitory computer readable medium of claim 18, wherein the suspicious activity is detected using a protection module using behavioral blockers or patterns of dangerous application behavior.

20. The non-transitory computer readable medium of claim 17, wherein the command for performing the anti-virus scan of the object comprises at least the following information: a location of the object and a name of the object.

* * * * *